United States Patent
Langlais et al.

(10) Patent No.: US 7,400,978 B2
(45) Date of Patent: Jul. 15, 2008

(54) METHOD FOR UPDATING A GEOLOGIC MODEL BY SEISMIC DATA

(75) Inventors: Valérie Langlais, Paris (FR); Mickaele Le Ravalec, Rueil-Malmaison (FR); Nathalie Lucet, Houilles (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 51 days.

(21) Appl. No.: 11/612,051

(22) Filed: Dec. 18, 2006

(65) Prior Publication Data
US 2007/0156341 A1 Jul. 5, 2007

(30) Foreign Application Priority Data
Dec. 21, 2005 (FR) .................................. 05 13066

(51) Int. Cl.
*G06F 15/00* (2006.01)
(52) U.S. Cl. ................................ 702/14; 703/1; 175/50
(58) Field of Classification Search .................. 702/14, 702/22, 182, 188; 703/1, 3; 175/40, 50
See application file for complete search history.

(56) References Cited

U.S. PATENT DOCUMENTS 5,444,619 A * 8/1995 Hoskins et al. ............... 702/13

6,302,221 B1 10/2001 Hamman et al.

FOREIGN PATENT DOCUMENTS

| EP | 1 081 510 A1 | 3/2001 |
|----|------|------|
| WO | WO 97/38330 | 10/1997 |

* cited by examiner

*Primary Examiner*—Edward Raymond
(74) *Attorney, Agent, or Firm*—Antonelli, Terry, Stout & Kraus, LLP.

(57) ABSTRACT

A method of predicting petrophysical characteristics of an underground reservoir by constructing a geologic model consistent with seismic measurements is disclosed which permits optimization of oil reservoir development schemes. A geologic model, from which seismic data are simulated in depth, is constructed in depth. The geologic model is made consistent with seismic measurements acquired in time by minimization of an objective function by comparing the seismic measurements with seismic data simulated from the geologic model and converted to time. During minimization, the interval velocities used for conversion are updated by comparing, within the objective function, an observed thickness in time $\Delta T^{obs\,m,n}$ between two markers with a thickness in time $\Delta T^{sim\,m,n}$ simulated from the seismic data, and by modifying simulation parameters such as the error $\epsilon_{sim}^{m,n}$ on the thickness of the two markers estimated in depth.

16 Claims, 2 Drawing Sheets

METHOD FOR UPDATING A GEOLOGIC MODEL BY SEISMIC DATA

BACKGROUND OF THE INVENTION

1. Field of the Invention

The present invention relates to a method for predicting petrophysical characteristics of an underground reservoir, comprising constructing and updating a geologic model constrained by data in time such as seismic data.

This methodology is part of the set of themes relative to reservoir characterization, whose objective is to provide reliable information on reservoirs in order to better predict their behaviour and to optimize their development scheme.

2. Description of the Prior Art

Updating geologic models is based on the inverse problem theory: some parameters of the geologic model, such as porosity or permeability, are adjusted iteratively to fit observation data, such as seismic data for example. As in any inverse problem, there is not one and only solution. In order to reduce uncertainties on the production prediction, it is necessary to integrate more observation data (logs, production data, seismic data, . . . ), which allows to better constrain the models.

Geologic models are a fine representation of the structure and of the behavior of an underground reservoir. These models consist of a set of cells, also referred to as grid cells, that form a grid. This grid represents a discretization of the reservoir and it has to be representative of the reservoir structure. In order to be able to reproduce the static or dynamic behaviour of a reservoir, two or three-dimensional property "maps" describing the static and/or dynamic behavior of the reservoir are associated with these models, referred to as geocellular models. It is thus well known to use stochastic simulation methods (Journel A., Huijbregts C., 1978, *"Mining Geostatistics"*, Centre de Géostatistique et de Morphologie Mathematique, London, Academic press). During these simulations, a property field or map constrained by reservoir data measured at the level of wells for example is produced.

Simultaneous integration, in the stochastic simulations, of several types of data, whether static or dynamic, allows considerable reduction of the space of the allowable geologic models and therefore to better predict the behaviour of the reservoirs studied. Some methods already use combined integration of geologic and seismic data. The seismic data recorded are the seismic amplitudes. A large number of attributes, referred to as seismic attributes, can be calculated from the latter to improve the raw data (amplitudes) interpretation. The most commonly used attributes are the impedances. They are generally determined from a seismic amplitude stratigraphic inversion technique. Such an approach is proposed for example by Tonellot et al. in the following document for example:

Tonellot, T., Macè, D., and Richard, V., 2001, *Joint Stratigraphic Inversion of Angle Limited Stacks,* 71st Ann. Internal. Mtg., Soc. Expl. Geophys., Expanded Abstracts, AVO 2.6, 227-230.

Impedances can also be obtained on a fine scale by means of stochastic techniques. Such a technique is proposed by Bortoli et al. in the following document for example:

Bortoli, L. J., Alabert F., Haas A. et Journel, A. G. 1993. *Constraining Stochastic Images to Seismic Data*. Geostatistics Troia 82, A. Soares (ed.), 325-337. Kluwer, Dordrecht.

The seismic amplitudes are here stochastically inverted on a fine grid. This approach allows to obtain several impedance cubes, all in accordance with the seismic amplitudes.

The seismic constraint (data resulting from the seismic amplitudes that the geologic model must meet) is often introduced as a secondary variable guiding the distribution of the variable of interest. Techniques known to the man skilled in the art, such as simulation techniques with external drift, or co-simulations using one or more seismic attributes as secondary variables, allow to distribute reservoir properties constrained by these seismic attributes. The following document can for example be mentioned:

Doyen P. M., 1988. Porosity from Seismic Data: A Geostatistical Approach. Geophysics 53(10), 1263-1275.

Another technique for using these seismic impedances to constrain geologic models is proposed in the following documents for example:

Matheron G., Beucher H., de Fouquet C., Galli A., Guerillot D., and Ravenne C. 1987: Conditional Simulation of the Geometry of Fluvio Deltaic Reservoirs. SPE $62^{nd}$ Annual Conference, Dallas, Tex., pp. 591-599, Matheron G., Beucher H., de Fouquet C., Galli A and Ravenne C., 1988: Simulation Conditionnelle à Trois Faciès Dans Une Falaise de la Formation du Brent. Sciences de la Terre, Série Informatique Géologique, 28, pp. 213-249, Galli A., Beucher H., Le Loc'h G., Doligez B. and Heresim group, 1993: the Pros and Cons of the Truncated Gaussian Method. In: Armstrong M. and Dowd P. A. (eds), Geostatistical Simulations, pp. 217-233, Kluwer Academic Publishers, 1993.

These documents use the technique referred to as "thresholded Gaussian". In this approach, seismic attributes are used to establish a lithofacies proportion curve matrix. This matrix then allows the spatial distribution of the lithofacies to be guided.

However, none of these aforementioned techniques allows to provide consistency between the geologic model thus obtained and the seismic impedances.

Thus, current techniques propose constructing geocellular reservoir models by means of stochastic simulations allowing spatial distribution of the lithofacies and/or of the reservoir properties (porosity and permeability for example). These simulations are constrained by well data, by geostatistical model parameters and possibly guided by one or more seismic attributes. However, it is not guaranteed that the geologic model obtained reproduces the seismic impedances obtained from the observed seismic data. In general terms, no method guarantees that the geologic model obtained reproduces the seismic data, that is a modelling of the seismic amplitudes from the geologic model does not provide a result that is consistent with the amplitudes measured during the seismic survey.

The proposed methodology allows obtaining geologic models consistent with the seismic data measured during the seismic survey.

SUMMARY OF THE INVENTION

The invention relates to a method for predicting petrophysical characteristics of an underground reservoir, comprising:

constructing a geologic model from geologic measurements acquired in depth;

simulating in depth seismic data;

acquisition in time of seismic measurements on which at least two seismic markers distant from one another by an observed thickness in time $\Delta T_{obs}^{m,n}$ are identified; and making the geologic model consistent with said seismic measurements by minimizing an objective function.

The method also comprises the following steps:

simulating in depth seismic velocities allowing to estimate the thickness in depth $\Delta Z_{est}^{m,n}$ of the markers, and simulating an error $\epsilon_{sim}^{m,n}$ made on this estimation;

carrying out time conversion of the seismic data simulated in depth by means of an interval velocity deduced from the observed thickness in time $\Delta T_{obs}^{m,n}$ and from the error $\epsilon_{sim}^{m,n}$.

updating this interval velocity by comparing, within the objective function, the observed thickness in time $\Delta T_{obs}^{m,n}$ with a thickness $\Delta T_{sim}^{m,n}$ simulated from the seismic data, and by modifying the simulation of said error $\epsilon_{sim}^{m,n}$;

carrying out the consistency enforcement operation by minimization of the objective function by comparing the seismic measurements with the simulated seismic data converted to time;

predicting the petrophysical characteristics of the underground reservoir from said geologic model thus consistent.

According to the method, the interval velocity can be calculated as the ratio of the thickness in depth $\Delta Z_{est}^{m,n}$ of said markers corrected for error $\epsilon_{sim}^{m,n}$ ($\Delta Z_{sim}^{m,n} = \Delta Z_{est}^{m,n} + \epsilon_{sim}^{m,n}$) to the observed thickness in time $\Delta T_{obs}^{m,n}$.

The simulated thickness in time $\Delta T_{sim}^{m,n}$ can be determined from the following: for each cell of a grid of the geologic model contained between the markers, the thickness in depth of the cell is simulated and divided by the seismic velocity of the cell, then all of the ratios obtained for the cells contained between the markers are vertically stacked.

According to the invention, it can be advantageous to use a gradual deformation technique for simulation of said error $\epsilon_{sim}^{m,n}$ on the estimation of the thickness in depth.

Finally, the seismic data used for making the geologic model consistent can be seismic impedances of P waves and seismic impedances of S waves.

BRIEF DESCRIPTION OF THE DRAWINGS

Other features and advantages of the method according to the invention will be clear from reading the description hereafter, given by way of non limitative example, with reference to the accompanying figures wherein.

DETAILED DESCRIPTION OF THE INVENTION

The present invention comprises a method for constructing and updating a geologic model representative of the structure and of the behavior of an underground reservoir, constrained by geologic data acquired in depth and seismic data acquired in time. According to a particular embodiment example, the seismic data can be seismic impedances. Thus, the method comprises developing an inversion loop allowing optimizing a geologic model described on a fine grid vertically in depth, so as to reproduce satisfactorily the seismic impedances described vertically in travel time and resulting from an inversion for example. The method is thus based on the inverse problem theory.

The method uses seismic data in time, that is as a function of the travel times of the seismic waves, and not of depth. The main challenge here is integration of a depth/time conversion process with updating of the geologic model during the optimization process.

Figure 1:
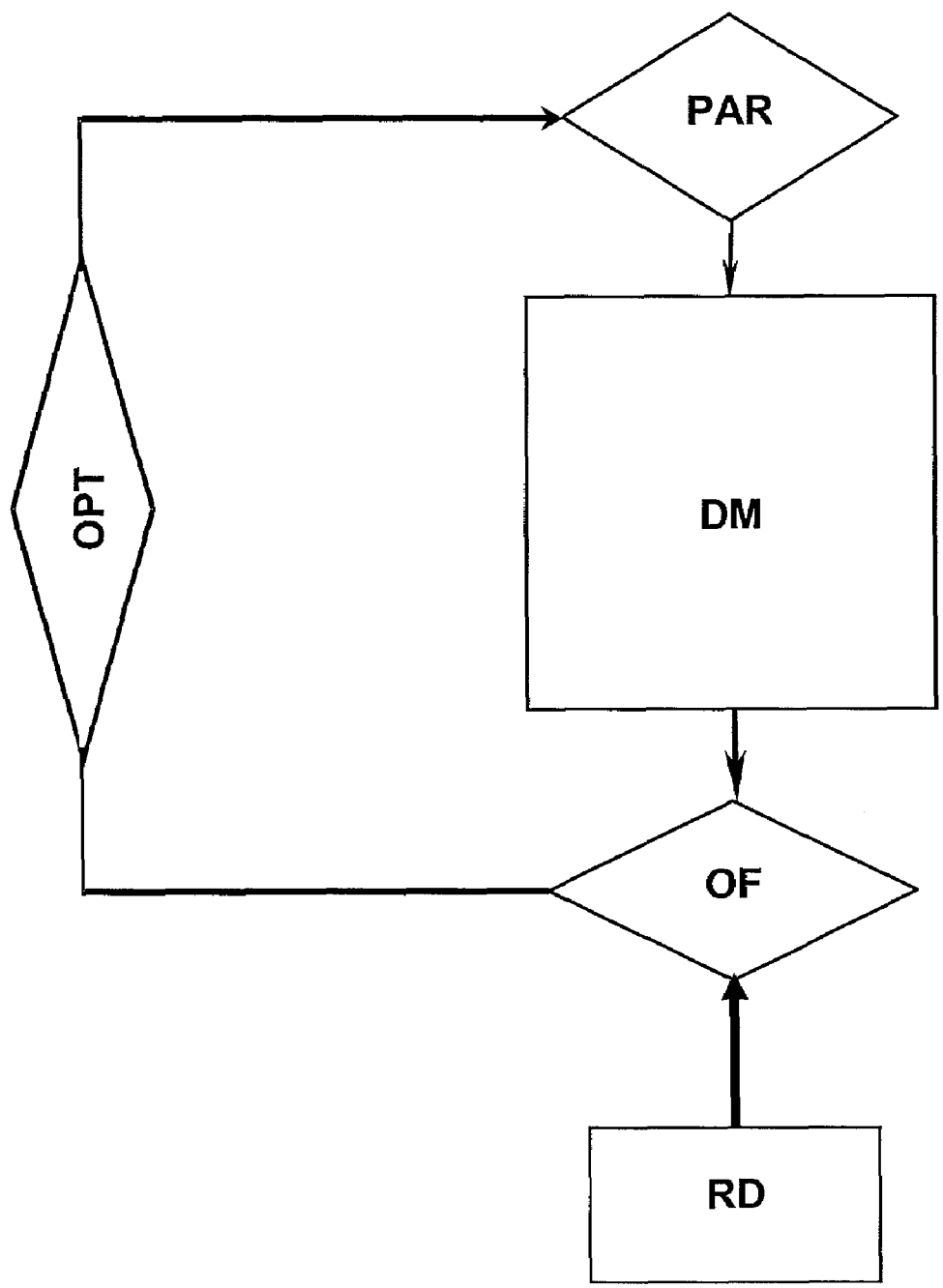
FIG. 1 illustrates the global geologic model calibration method.

FIG. 1 illustrates the global geologic model calibration method. The first stage is a parameterization stage (PAR), is a step wherein a set of parameters used during stochastic simulations allows generating the various elements of the geologic and petro-elastic models, as well as the error on the interval velocities, is defined. Seismic impedances converted to time and thicknesses between time markers are then simulated via a direct model (DM) and compared within an objective function (OF) with the corresponding observed data (RD). An optimization (OPT) is then carried out to modify the parameters so as to minimize the objective function.

The methodology then comprises the following stages:

Construction of the geologic model and of a petro-elastic model;

Consistency enforcement of the geologic model and of the seismic impedances:

depth/time conversion with simulation of an interval velocity and definition of a conversion quality criterion;

definition of an objective function; and optimization.

Step 1: Construction of the Geologic Model and of a Petro-Elastic Model

Construction of a geologic model and of a petro-elastic model constitutes the direct model (DM). It allows construction of a modelling chain allowing construction of a fine geologic model, and numerical simulation of the synthetic responses relative to the data to be integrated: the seismic impedances.

1.1—Data Acquisition

The data necessary for construction of a fine geologic model consistent with the seismic impedances are presented hereafter:

Data referred to as geologic data first have to be acquired. These data are acquired in depth and come from logs obtained from wells, measurements on drill cores, or rock fragments from the subsoil;

It is of course also necessary to acquire seismic data allowing determination, by inversion for example, the seismic impedances. The seismic impedances related to P waves and possibly the seismic impedances related to S waves can be determined. These data are acquired in time and they are denoted by $I_P^{obs}$ and $I_S^{obs}$. Superscript "obs" designates observed data to which the geologic model is to be calibrated.

The first step of constructing the geologic model grids the reservoir.

1.2-Reservoir Gridding

The underground reservoir is first divided up into a set of volumes called cells. This set constitutes a grid of the reservoir and it is part of the geologic model to be constructed. It is in a way the framework of the geologic model. Many techniques known to the man skilled in the art allow such a grid to be achieved.

1.3-Reservoir Property Integration: Construction of the Geologic Model

To construct the geologic model, characteristic values of the properties of the geologic formations that make up the reservoir are associated in each cell of this grid. It can be lithofacies (type of rock or lithologic facies) or reservoir properties (porosity, permeability, density, . . . ).

Generation of the geologic model is performed with geostatistical modelling tools such as those described in the following documents:

L.-y. Hu. *Gradual Deformation and Iterative Calibration of Gaussian-related Stochastic Models*. Mathematical Geology Vol. 32, pp. 87-108, 2000.

M. Le Ravalec-Dupin, B. Noetinger. *Optimization with the Gradual Deformation Method*. Mathematical Geology Vol. 34, No. 2, pp. 125-142, 1-2-2002.

Matheron G., Beucher H., de Fouquet C., Galli A., Guerillot D., et Ravenne C. 1987: *Conditional Simulation of the Geometry of Fluvio Deltaic Reservoirs*. SPE 62nd Annual Conference, Dallas, Tex., pp. 591-599.

According to an embodiment example, a geostatistical model based on a random Gaussian field is used to generate the porosity ($\Phi$) and density ($\rho$) fields.

According to another embodiment, it may be advantageous to first integrate lithofacies data, that is the type of rock, into the geologic model. In fact, this description of the reservoir in lithofacies allows working by lithofacies, that is probability laws can be defined, different simulation types by lithofacies thus making the model more accurate. Lithofacies properties can therefore be integrated for example into the grid of the geologic model by means of the thresholded Gaussian method. This method has the advantage of being compatible with the gradual deformation technique, which allows the method to be made more effective. Any other method allowing use of gradual deformations in the solution of the inverse problem can also be advantageously used. The integration operation can be constrained by one or more seismic attributes directly (simulation techniques with external drift or co-simulation for example) or indirectly (proportion curves derived from seismic attributes).

It is then possible to either assign a constant value per lithofacies for each reservoir property, or to draw lots in distributions defined per lithofacies, or to carry out co-simulations of variables ($\Phi,\rho$) per lithofacies. It is also possible to simulate the volume of shale $V_{SH}$ by either assigning a constant value per lithofacies or by drawing lots in distributions defined per lithofacies, according to the petro-elastic model used.

According to a particular embodiment, the contacts within the reservoir between the oil and the water ("OWC") and between the gas and the water ("GWC") are also determined. This information allows refining the values and/or the distributions by making them dependent of the position of the cell in relation to the contacts. The saturation depends on the position above the contact. If the transition zone is clear-cut, one rapidly goes from Sw=100% to Sw=Swi, but there can also be more progressive transition zones.

In any case, the reservoir properties can be associated with the geologic model grid by generating random numbers, then by applying a simulation method. Thus, a set of random numbers allows stimulation of facies values at any cell of the model, and another set of random numbers allows simulation of reservoir property values at any cell of the model.

By modification of the parameters used during simulation and optimization (gradual deformation for example), new random numbers can be generated to update the geologic model.

Thus, at the end of this stage, a fine geologic model described in reservoir property (porosity $\Phi$, density $\rho$, volume of shale $V_{sh}$ . . . is obtained). The model can also be described in lithofacies.

Parameterizing the geostatistical models is a fundamental operation for guaranteeing the success of the stage of data integration in the geologic model. In fact, updating of the geologic model by the seismic data is based on the solution of an inverse problem. Selection of the parameters to be calibrated thus appears to be essential to allow minimization of the objective function that measures the difference between the data observed in the field and the simulation results.

1.4-Seismic Impedances Integration

One of the objectives of the method according to the invention is to make the geologic model thus constructed consistent with the seismic impedances. An inverse problem simulates seismic impedance values from the geologic model, then in comparing them with the observed impedances is therefore solved.

To inform the geologic model on impedances, a petro-elastic model corresponding to the geologic model informed at least on density and seismic velocities is constructed. There are at least two possible procedures:

According to a first embodiment, density and seismic velocity data are available from wells. The same principle as the principle used to associate reservoir properties with the geologic model is then used to simulate at any cell of the grid the density and the seismic velocities.

The petro-elastic model then corresponds to the geologic model informed, by simulation, on the seismic velocity of the P waves ($V_P$) and density ($\rho$). If the observed impedances S are available, the seismic velocity of the S waves ($V_S$) is preferably also associated.

According to another embodiment, only the following reservoir variables are generated: the porosity ($\Phi$) and the volume of shale ($V_{sh}$). The elastic variables $V_P$ ($V_S$) and $\rho$ are then calculated from these reservoir variables, and from the initial saturations or pressures acquired or calculated otherwise. The saturations and pressures are calculated from the contacts and the capillary pressures, then a petro-elastic model is applied to go from the petro data to the elastic data.

Then, to construct the model in seismic impedances, the density just has to be multiplied by the seismic velocities:

$$I_P = \rho \cdot V_P \text{ and } I_S = \rho \cdot V_S.$$

Thus, at the end of this stage 1, a fine geologic model described in reservoir properties (porosity, permeability, . . . os obtained), possibly in lithofacies, and in terms of simulated seismic impedances $I_P^{sim}$ and possibly $I_S^{sim}$ a parameterization of the geologic model.

The seismic impedances simulated from this geologic model must be compared with the observed seismic impedances, that is the impedances obtained from the seismic data, by stratigraphic inversion for example.

Here again, the geostatistical model parameterizing operation is fundamental to guarantee the success of the stage of integration of the data in the petro-elastic model.

Step 2: Consistency Enforcement of the Geologic Model and of the Seismic Impedances Consistency is achieved by an inverse module allowing minimizing an objective function measuring the difference between the simulation results of the direct module and the observed data by modifying a certain number of parameters of the direct module. These parameters can be relative to:

the geologic model (distribution of the facies, porosities, permeabilities, etc.), the petro-elastic model (Gassmann law, etc.), the depth/time conversion model (velocity law).

Updating the geologic model and making it consistent with the observed seismic impedances is carried out using an iterative method based on the calculation of an objective function. This function determines the difference between the simulated values and the observed values. The simulation parameters are then modified to simulate new values and to reduce the difference in relation to the observed data, thus to decrease the value of the objective function. The procedure is repeated until the objective function is sufficiently low to admit that the calibration between the simulated data and the observed data is acceptable.

According to the method, it is desired to improve, upon each iteration, the calibration of the seismic impedances, and also the depth/time conversion. A quality criterion is therefore defined as described hereafter.

2.1-Depth/Time Conversion

Updating of the geologic model is done by comparison of the simulated and observed seismic impedances through an iterative process described hereafter. The main difficulty for comparing such data lies in the fact that the seismic impedances of the geologic model are simulated in depth, whereas the seismic impedances directly obtained from the seismic data are observed in time. It is thus necessary to convert the data to the same scale, time or depth.

A solution determines the velocity of the medium for converting the depths to time (or vice versa). During the petro-elastic model construction stage, the seismic velocities have already been simulated. It is therefore possible to convert the data simulated in depth to space-time. However, these velocities are not accurate because they are simply simulated.

Furthermore, it is well known that the velocity varies as a function of depth and according to the lithologies encountered. A technique thus vertically subdivides the seismic data by defining zones where the velocity is substantially constant or meets a law as a function of depth. It is well known that the seismic waves emitted in the subsoil are reflected by markers, referred to as seismic markers, which correspond to impedance contrasts. Now, impedance is a function of density and velocity. Thus, by a seismic picking operation, a set of seismic markers is defined, then, between each one of them, and an interval velocity from the simulated seismic velocities ($V_P$) is determined.

For two identified (picked) markers denoted by m and n, $V_{sim}^{m,n}$ is the interval velocity of the P waves simulated between these markers. By definition, the thickness in time between these markers is known. This thickness in time is denoted by $\Delta T_{obs}^{m,n}$. Superscript "obs" indicates that it is an observed thickness in time obtained from the seismic picking.

By means of the simulated interval velocity between markers m and n, it is possible to estimate the thickness between these markers in depth $\Delta Z_{est}^{m,n}$:

$$\Delta Z_{est}^{m,n} = V_{sim}^{m,n} \cdot \Delta T_{obs}^{m,n}$$

This interval velocity thus allows conversion to time of the seismic impedances simulated in depth. Comparison with the data observed in time is then easy. However, this simulated interval velocity inevitably leads to errors. It is only a simulated value. This induces that the conversion is not entirely accurate, and also that the comparison between the simulated impedances and the observed impedances will not be right because it does not establish a relation between impedances located at the same point (depth or time). This can be critical, especially at the interfaces.

This is the reason why, according to the invention, this conversion law is updated during calibration to the seismic impedance data. It is therefore necessary to define, on the one hand, a quality criterion allowing determination of whether the conversion is improved or not and, on the other hand, a parameter allowing, by modification, to improve the conversion. A first modifiable parameter is of course the simulated P wave velocity ($V_P$). The method provides an iterative method allowing updating the geologic model while updating the depth/time conversion law of the geologic model. Therefore, a comparison is made of not only the seismic impedances, but also the thicknesses in time between identified markers.

Interval Velocity Simulation

The conversion law, that is the simulated interval velocity $V_{sim}^{m,n}$, inevitably leads to errors. According to the invention, this error denoted by $\epsilon$ is expressed as a variance map. This error is relative to the thicknesses in depth, it is related to the error on the time and on the velocity. A Gaussian realization of this error is simulated for each interval defined between two markers, $\epsilon_{sim}^{m,n}$, and the simulated reservoir thickness is defined as the sum of the estimated thickness $\Delta Z_{est}^{m,n}$ and of this error $\epsilon_{sim}^{m,n}$:

$$\Delta Z_{sim}^{m,n} = \Delta Z_{est}^{m,n} + \epsilon_{sim}^{m,n}.$$

Thus, the parameters required for the Gaussian realization of error $\epsilon_{sim}^{m,n}$, which are Gaussian random numbers, can be modified so as to vary $\Delta Z_{sim}^{m,n}$ used for calculation of a conversion quality criterion as described below.

The thicknesses of each cell c of the grid of the geologic model contained between markers m and n will be recalculated to take account of $\epsilon_{sim}^{m,n}$. This error can be distributed homogeneously $$\left( \frac{dz_{sim}^c}{\Delta Z_{sim}^{m,n}} = \frac{dz_{est}^c}{\Delta Z_{est}^{m,n}} \right)$$

or over some layers only.

Depth/time conversion is then carried out by calculating between two seismic markers an interval velocity defined by:

$$V_{int}^{m,n} = \frac{\Delta Z_{sim}^{m,n}}{\Delta T_{obs}^{m,n}}.$$

This interval velocity is homogeneously applied to all the interval samples to provide consistency between the measurements to be compared.

According to a particular embodiment, filtering in the seismic passband is applied after this stage. In fact, the geologic model is at a higher frequency than the seismic, it is therefore necessary to go down to the frequency band of the seismic. Filtering of the compression (P) and shear (S) impedances from the petro-elastic model is therefore performed. The filtering function selected (Martin filter for example) allows using a band-pass filter, a notch filter, a low-pass filter or a high-pass filter. This sequential filtering of the simulated cubes at $I_P$ ($I_S$) is applied in order to have a frequency content similar to the seismic cube of the observed impedances. There are two possible options:

a) Filter the high frequencies (low-pass filter); and
 b) Filter the very low frequencies and the high frequencies (band-pass filter). In this case, the observed seismic impedances will also be filtered of the very low frequencies.

Definition of a Conversion Quality Criterion

From the seismic picking of two markers m and n, it is known that their thickness in time $\Delta T_{obs}^{m,n}$. From the geologic model and the elastic property integration, it is possible to simulate the thickness in time between markers m and n, denoted by $\Delta T_{sim}^{m,n}$. Thus, a good conversion of the data acquired in depth to a time scale must allow calibration of the overall thickness in time between the two markers, i.e. $\Delta T_{obs}^{m,n}$ and $\Delta T_{sim}^{m,n}$ must be nearly equal.

This difference between $\Delta T_{obs}^{m,n}$ and $\Delta T_{sim}^{m,n}$ is integrated in a global objective function that is minimized both by this difference and by the difference between the seismic impedances.

The simulated thickness in time between markers m and n ($\Delta T_{sim}^{m,n}$) is determined as follows. In the grid of the geologic model, the cells are located in three dimensions by their co-ordinates i, j, k. Between these two markers and for given i and j, k ranges from $k_n$ to $k_m$ (vertical indices of the cells containing the seismic markers). The thickness in time of a cell (i, j, k) is denoted by dT(i, j, k). Thus:

$$\Delta T_{sim}^{m,n} = \sum_{k=k_n}^{k_m} dT(i, j, k)$$

Thickness dT(i, j, k) is calculated from the integration into the geologic model of the seismic velocity. In fact, each cell is informed on simulated P wave velocities ($V_P$) during construction of the petro-elastic model.

Let $dz_{sim}(i, j, k)$ be the simulated thickness in meter of the cell of co-ordinates i, j, k and let $V_P^{sim}(i, j, k)$ be the simulated seismic velocity of this cell, then the thickness in travel time of this cell, dT(i, j, k) is $$\frac{dz_{sim}(i, j, k)}{V_P^{sim}(i, j, k)}.$$

It is thus obtained:

$$\Delta T_{sim}^{m,n} = \sum_{k=k_n}^{k_m} \frac{dz_{sim}(i, j, k)}{V_P^{sim}(i, j, k)}$$

This sum is calculated for each pair of consecutive seismic markers. This sum is compared in the objective function with the thickness in time obtained from picking $\Delta T_{obs}^{m,n}$.

2.2-Definition of the Objective Function

Updating the geologic model is performed by minimization of an objective function that measures the error between the observed data and the simulation results obtained for a fixed value of the parameters.

Several formulations can be considered, but the one in the sense of the least squares is the most commonly used in the petroleum sphere. In the present case, the objective function that is minimized at each stage is made up of the following terms:

To minimize the difference in relation to the observed seismic impedances: $(I_P^{sim} - I_P^{obs})^\alpha$ and possibly $(I_S^{sim} - I_S^{obs})^\alpha$ to minimize the difference with the thicknesses in time between the markers: $(\Delta T_{sim}^{m,n} - \Delta T_{obs}^{m,n})^\alpha$ for all the consecutive pairs of seismic markers (m, n) with α an integer, generally 2 (norm L2 is referred to), but it is possible to use other norms than norm L2.

Weighting of the various terms is necessary to avoid dominance of a term in relation to another one. This weighting depends on the measuring errors. The error on the seismic picking in time will be introduced at this point.

Figure 2:
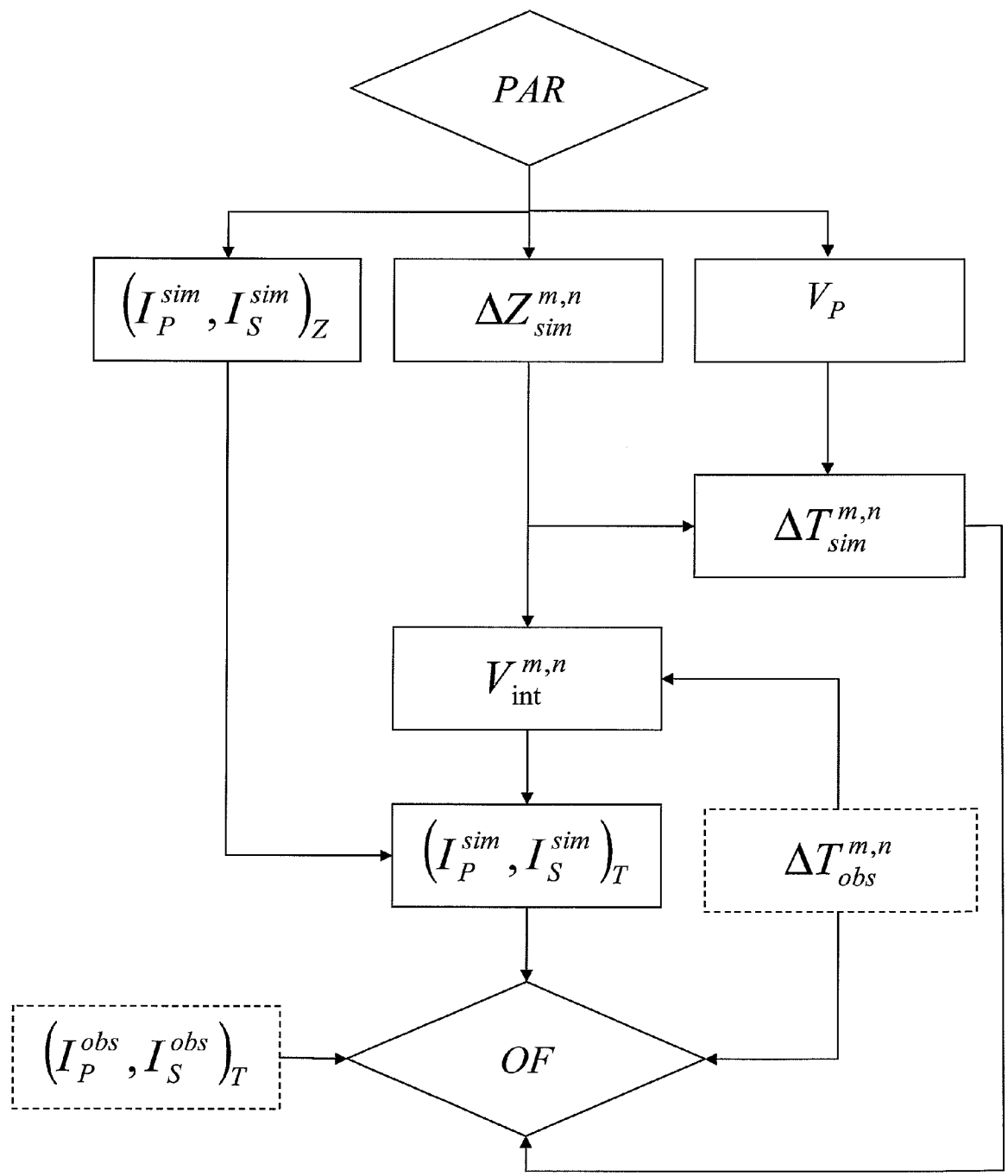
FIG. 2 illustrates in detail the stages of the method according to the invention.

FIG. 2 illustrates in detail the method according to the invention. The parameterization stage (PAR) provides, via stochastic simulations, at least the seismic impedances in depth, $(I_P^{sim}, I_S^{sim})_Z$, the thickness in time of the intervals, $\Delta Z_{sim}^{m,n}$, and the P wave velocity $V_P$. The thickness in time of the intervals $\Delta T_{sim}^{m,n}$ is then calculated from $\Delta Z_{sim}^{m,n}$ and $V_P$. The interval velocity on each interval, $V_{int}^{m,n}$, is also simulated from $\Delta Z_{sim}^{m,n}$ and the thickness in time of the intervals observed on the seismic data (picking) $\Delta T_{obs}^{m,n}$. $(I_P^{sim}, I_S^{sim})_Z$ is then converted to time by means of the velocities of each interval $V_{int}^{m,n}$ and $(I_P^{sim}, I_S^{sim})_T$ is obtained. These data are then compared within the objective function (OF) with the observed data $(I_P^{obs}, I_S^{obs})_T$ and, simultaneously, $\Delta T_{sim}^{m,n}$ is compared with $\Delta T_{obs}^{m,n}$.

If the result of the objective function is too high, parameters (PAR) are modified to simulate new values, as described hereafter.

2.3-Optimization

To optimize the geologic model by making it consistent with the seismic data while respecting the thickness in time between two consecutive markers, the parameters of the different models are modified in order to modify the model in such a way that the objective function is minimized.

In this example, a particular method is preferably used to generate and convert geostatistical realizations: the local or global gradual deformation method. This method is described for example in the following documents:

L.-y. Hu. *Gradual Deformation and Iterative Calibration of Gaussian-related Stochastic Models*. Mathematical Geology Vol. 32, pp. 87-108, 2000.

L.-y. Hu. *Combinaison of Dependent Realizations Within the Gradual Deformation Method*. Mathematical Geology Vol. 34, pp. 953-963, 2002.

L.-y. Hu, G. Blanc. *Constraining a Reservoir Facies Model to Dynamic Data Using a Gradual Deformation Method*. 6$^{th}$ Conference on the Mathematics of Oil Recovery, Peebles, 1998.

This choice can be made for reasons of stability, rapidity and reduction of the number of parameters to be considered for optimization (then equal to the number of gradual deformation parameters whatever the grid size).

This methodology provides a high parameterization flexibility, that is it provides a wide selection of models to be modified while having a reduced number of parameters. According to the method and according to the embodiment, it is thus possible to:

adjust the statistics of the petro-elastic variables (mean, variance, spatial distributions (variogram), correlation coefficients) according to the simulation method selected;

adjust the statistics on the error (ε) in thickness (mean, variance, spatial distributions);

adjust the parameters involved in the petro-elastic model;

adjust the contact values;

adjust the parameters involved in the saturation and initial pressure calculations.

Using the gradual deformation technique also allows to:

adjust the spatial distribution of the lithofacies;

adjust the spatial distributions of petro-elastic variables;

adjust the spatial distribution of the errors in thickness (which amounts to adjusting the thickness in depth of the cells of the geologic model grid).

The method has been illustrated by calibrating the seismic impedances and the thicknesses in time, but it is clear that all types of properties allowing the static or dynamic behavior of the reservoir to be characterized can be added to this optimization loop. All that has to be done is add a term in the objective function, measure the suitable observable data and simulate, preferably from a method compatible with gradual deformations, the desired properties. The geologic model can for example also be constrained by production data.

After optimization, a fine geologic model informed for example on porosity, permeability, density and/or seismic velocities, consistent with the seismic data and adjusted in time, therefore in interval velocity, is obtained.

This methodology applies to heterogeneous reservoir modelling constrained by seismic impedances. It also falls within the scope of uncertainty calculations relative to the volumes in place. It furthermore provides a starting point for the construction of reservoir models (static and/or dynamic) constrained by repeated seismic (French patent application EN-05/05,612) since it affords consistency with the basic seismic. It therefore allows characterizing an oil reservoir by providing reliable information about these reservoirs in order to predict their behavior so as to better predict their hydrocarbon production and to optimize their development scheme.

The invention claimed is:

1. A method allowing prediction of petrophysical characteristics of an underground reservoir, comprising:
    constructing a geologic model from geologic measurements acquired in depth;
    simulating in depth seismic data, acquisition in time of seismic measurements on which at least two seismic markers distant from one another by an observed thickness in time $\Delta T_{obs}^{m,n}$ are identified;
    making the geologic model consistent with the seismic measurements by minimizing an objective function;
    simulating in depth seismic velocities allowing estimation of the thickness in depth $\Delta Z_{est}^{m,n}$ of the markers, and simulating an error $\epsilon_{sim}^{m,n}$ made on this estimation;
    carrying out time conversion of the seismic data simulated in depth by means of an interval velocity deduced from the observed thickness in time $\Delta T_{obs}^{m,n}$ and from the error $\epsilon_{sim}^{m,n}$;
    updating the interval velocity by comparing, within the objective function, the observed thickness in time $\Delta T_{obs}^{m,n}$ with a thickness in time $\Delta T_{sim}^{m,n}$ simulated from the seismic data, and by modifying said simulation of said error $\epsilon_{sim}^{m,n}$;
    carrying out the consistency enforcement operation by minimization of the objective function by comparing the seismic measurements with the simulated seismic data converted to time; and
    predicting the petrophysical characteristics of the underground reservoir from the geologic model.

2. A method as claimed in claim 1 wherein:
    the interval velocity represents a ratio of the thickness in depth $\Delta Z_{est}^{m,n}$ of the markers corrected for error $\epsilon_{sim}^{m,n}$ to the observed thickness in time $\Delta T_{obs}^{m,n}$.

3. A method as claimed in claim 2, wherein:
    the simulated thickness in time $\Delta T_{sim}^{m,n}$ is determined for each cell of a grid of the geologic model contained between the markers, the thickness in depth of the cell is simulated and divided by the seismic velocity of the cell and then all of the ratios obtained for the cells contained between the markers are vertically stacked.

4. A method as claimed in claim 3, wherein the simulation of the error $\epsilon_{sim}^{m,n}$ on an estimation of thickness in depth is performed by means of a gradual deformation technique.

5. A method as claimed in claim 4, wherein the geologic model is made consistent with seismic impedances of P waves and seismic impedances of S waves.

6. A method as claimed in claim 3, wherein the geologic model is made consistent with seismic impedances of P waves and seismic impedances of S waves.

7. A method as claimed in claim 2, wherein the simulation of the error $\epsilon_{sim}^{m,n}$ on an estimation of thickness in depth is performed by means of a gradual deformation technique.

8. A method as claimed in claim 7, wherein the geologic model is made consistent with seismic impedances of P waves and seismic impedances of S waves.

9. A method as claimed in claim 2, wherein the geologic model is made consistent with seismic impedances of P waves and seismic impedances of S waves.

10. A method as claimed in claim 1, wherein:
    the simulated thickness in time $\Delta T_{sim}^{m,n}$ is determined for each cell of a grid of the geologic model contained between the markers, the thickness in depth of the cell is simulated and divided by the seismic velocity of the cell and then all of the ratios obtained for the cells contained between the markers are vertically stacked.

11. A method as claimed in claim 10, wherein the simulation of the error $\epsilon_{sim}^{m,n}$ on an estimation of thickness in depth is performed by means of a gradual deformation technique.

12. A method as claimed in claim 11, wherein the geologic model is made consistent with seismic impedances of P waves and seismic impedances of S waves.

13. A method as claimed in claim 10, wherein the geologic model is made consistent with seismic impedances of P waves and seismic impedances of S waves.

14. A method as claimed in claim 1, wherein the simulation of the error $\epsilon_{sim}^{m,n}$ on an estimation of thickness in depth is performed by means of a gradual deformation technique.

15. A method as claimed in claim 14, wherein the geologic model is made consistent with seismic impedances of P waves and seismic impedances of S waves.

16. A method as claimed in claim 1, wherein the geologic model is made consistent with seismic impedances of P waves and seismic impedances of S waves.

\* \* \* \* \*